(12) United States Patent
Liu

(10) Patent No.: US 7,378,784 B1
(45) Date of Patent: May 27, 2008

(54) OPTICAL FILTER FOR CIE DAYLIGHT SIMULATOR

(76) Inventor: Yan Liu, 1460 Rockhaven St., Monterey Park, CA (US) 91754

( * ) Notice: Subject to any disclaimer, the term of this patent is extended or adjusted under 35 U.S.C. 154(b) by 334 days.

(21) Appl. No.: 11/129,703

(22) Filed: May 13, 2005

(51) Int. Cl.
*H01J 5/16* (2006.01)

(52) U.S. Cl. .................................... 313/110; 313/112

(58) Field of Classification Search ........ 313/110–112; 359/359
See application file for complete search history.

(56) References Cited

U.S. PATENT DOCUMENTS

| | | |
|---|---|---|
| 3,504,959 A | 4/1970 | Hennessey |
| 4,072,856 A | 2/1978 | Eligehausen |
| 4,659,178 A | 4/1987 | Kyogoku |
| 4,865,405 A | 9/1989 | Kageyama |
| 5,149,182 A | 9/1992 | Keller |
| 6,611,082 B1 | 8/2003 | McGuire |
| 6,693,373 B2 | 2/2004 | Ota |

OTHER PUBLICATIONS

Liu et al, "Optimization Algorith for Designing Colored Glass Filters to Simulate CIE Illuminant D65"vol. 16, No. 2, pp. 89-96 (1991).

*Primary Examiner*—Vip Patel
(74) *Attorney, Agent, or Firm*—Thomas I. Rozsa

(57) ABSTRACT

An optical filter used for modifying the spectral power distribution of high color temperature lamp to simulate CIE standard daylight illuminant. The optical filter comprising a heat-absorbing glass plate, a heat insulation washer, a longpass glass plate, and one or more spectral modification glass plate in series. The longpass glass plate and the heat absorbing glass plate determine the wavelength range, and the spectral modification glass plate(s) modify the spectral power distribution of the high color temperature halogen lamp. The CIE daylight simulators with the optical filter have very high colorimetric indexes.

16 Claims, 5 Drawing Sheets

OPTICAL FILTER FOR CIE DAYLIGHT SIMULATOR

BACKGROUND OF THE INVENTION

1. Field of the Invention

The present invention relates generally to an optical filter used for modifying spectral power distribution of a lamp, particularly to an optical filter capable of modifying the spectral power distribution of a high color temperature halogen lamp from 3500 K to 6500 K to simulate CIE standard daylight illuminant with very high color rendering index, ultraviolet light free if required, and much less heat emission.

The optical elements for modifying the spectral power distribution of a light source are colored glass filters, thin film filters, and liquid filters. The most used element is a single colored glass filter to modify the spectral power distribution of a lamp to simulate the Commission Internationale de L'eclairage (hereinafter "CIE") standard daylight illuminant. The colored glass plates can be arranged in serial and/or parallel arrangements. However, practically the colored glass plates in serial and parallel arrangements are rarely used for modifying the spectral power distributions due to the complexity of design, difficulty of fabrication, and high cost. At present, thin film filters and liquid filters are rarely used for simulating CIE standard daylight illuminant.

Currently, commercially available full spectral CIE daylight simulators are made by one color temperature conversion glass filter with a halogen lamp. The colorimetric indexes of such CIE daylight simulators are generally not high, and the spectra of the CIE daylight simulators do not match that of CIE D illuminant well.

2. Description of the Prior Art

As shown in Hennessey U.S. Pat. No. 3,504,959, a light filter can be directly coated on the front glass of a lamp to modify the spectral power distribution of the lamp.

As shown in Ota U.S. Pat. No. 6,693,373, a colored filter can be easily mounted in a xenon lamp or a halogen lamp, and is capable of making the lamps emit stable bluish light for automobile lighting. However, the capability for modifying the spectral power distribution of both filters is not sufficient for simulating CIE standard daylight illuminant.

As shown in the Kageyama U.S. Pat. No. 4,865,405 and the Kyogoko U.S. Pat. No. 4,659,178, some optical filters have been disclosed for color correction. Such optical filters comprise one or two plates of colored glass and one or two interference multiplayer film. The interference multiplayer films are coated on the colored glass plates. The plates have the narrow band-pass or heat absorbing characteristics. The glass plates and the interference multiplayer films are in series. The optical filters are capable of providing narrow pass bands for color correction of color devices. However, the optical filters are not capable of modifying the spectral power distribution of a lamp to simulate CIE standard daylight illuminant.

As shown in Eligehausen U.S. Pat. No. 4,072,856, a daylight-simulating incandescent lamp light fixture was disclosed for medical and dental use. The fixture has a reflector that selectively reflects the light from a 3000 K incandescent lamp to approximately match daylight.

At present, several high color temperature halogen lamps are commercially available from 3500 K to 6500 K as daylight lamps as shown in the McGuire U.S. Pat. No. 6,611,082. The high color temperature of the halogen lamp is mainly achieved by the specially designed reflector that predominately reflects short wavelength visible light. At high color temperature over 4200 K, the spectral power distribution of a halogen lamp significantly differs from that of CIE daylight illuminant. Such type of high color temperature halogen lamp cannot be used as a standard CIE daylight simulator for colorimetric purposes, such as visual color match and color grading. Nevertheless, some of the high color temperature halogen lamps are new types of light sources for simulating CIE standard daylight illuminant with high colorimetric indexes.

As discussed in the article by Liu et al. entitled "Optimization Algorithm for Designing colored Glass Filters to Simulate CIE Illuminant D65"; Color Research and Application, Vol. 16, No. 2, pp. 89-96 (1991), Liu et al. used an optimization algorithm for designing colored glass filters in parallel arrangement to simulate CIE illuminant D65. The D65 daylight simulators have high color rendering index. The spectral power distributions of the D65 simulators match that of the CIE standard illuminant D65 very well. However, the filters in parallel arrangement are difficult to design, complex to fabricate and are made at a high cost. The D65 daylight simulators with colored glass filters in parallel arrangement have a high academic value, but little practical and industrial application.

As shown in Keller U.S. Pat. No. 5,149,182, optical filters with glass plates in series have been used for modifying the spectral response of detector for matching the spectral response of the human eye and other CIE color matching functions for the purposes of colorimetric measurement and photometric measurement. An optical filter with color glass plates in series has been pursued for simulating CIE standard daylight illuminant with high colorimetric indexes and better spectral match. It is therefore an object of the invention to provide an optical filter for simulating the CIE standard daylight illuminant at different color temperatures.

SUMMARY OF THE INVENTION

The main object of the present invention is to provide an optical filter for modifying the spectral power distribution of high color temperature halogen lamps to simulate CIE standard daylight illuminant at different color temperatures.

Another object of the present invention is to provide an optical filter to modify the spectral power distribution of the high color temperature halogen lamps to simulate CIE standard daylight illuminant at different color temperatures in the visible wavelength band.

These and other objects of the invention can be accomplished by providing an optical filter comprised of a heat absorbing glass plate, a heat insulation washer, a longpass glass plate, and one or more spectral modification glass plates in series. The heat absorbing glass plate is the first one to transmit the light from the lamp and to absorb the heat (infrared radiation of the lamp). The heat insulation washer is placed between the heat absorbing glass plate and other glass plates to prevent direct heat transfer that may cause heat damage to other glass plates. The longpass glass plate and the heat absorbing glass plate combine to set the wavelength range of the CIE simulator, and the spectral modification glass plate modifies the spectral power distribution of the high color temperature halogen lamp to match that of the CIE standard daylight illuminant with optimal colorimetric indexes.

The above and other objects and advantages and novel features of the present invention will become apparent from the following detailed description of the preferred embodiments of the invention thereof taken in conjunction with the accompanying drawings.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
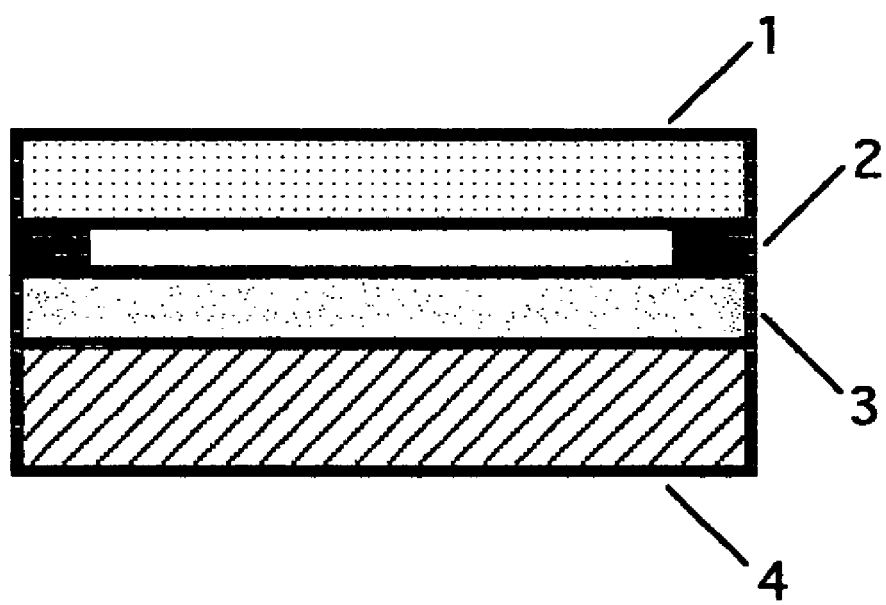
FIG. 1 is a schematic side sectional view showing the optical filter of the present invention: 1. heat absorbing glass plate, 2. heat insulation washer, 3. longpass glass plate, and 4. spectral modification glass plate(s)

The present invention is an optical filter for modifying the spectral power distribution of a light source for simulating a CIE standard daylight illuminant. FIG. 1 is a schematic side sectional view of the optical filter showing the glass plates in series. The optical filter comprises a heat absorbing glass plate, a heat insulation washer, a longpass glass plate, and one or more spectral modification glass plates.

The heat absorbing glass plate 1, also called an infrared absorbing glass plate, which can range from 0.3 mm to 10.0 mm in thickness absorbs infrared radiation from a lamp. The infrared radiation does not contribute to visual perception, but may cause heat damage to other glass plates and the illuminated object. The heat absorbing glass plate 1 has slightly selective absorption in the visible wavelength range. Therefore, the heat absorbing glass plate also slightly contributes to spectral modification. The heat absorbing glass plate must be tempered or heat strengthen treated for possible heat damage.

The heat insulation washer 2 insulates heat from the heat absorbing glass plate 1 and prevents the heat from being directly transferred to other glass plates. Under a halogen lamp, the temperature of the heat absorbing glass plate 1 can be very high, and any direct contact between the heat absorbing glass plate 1 and other glass plates 3 and 4 may also cause heat damage to other glass plates 3 and 4. The shape of the heat insulation washer 2 which can range from 0.02 mm to 0.5 mm in thickness is the same as the outline of the glass plates 1, 3, and 4, each of which can range from 10.0 mm to 200 mm usually in a round or a square shape. The width of the heat insulation washer 2 should be narrow, and usually can arrange from 0.05 mm to 10 mm. The narrower the width of the washer, the more light passes through the aperture of the heat insulation washer 2.

The longpass glass plate 3 which can range from 0.2 mm to 10.0 mm in thickness blocks all unwanted ultraviolet radiation from lamp 6 to prevent photo damage or unwanted ultraviolet fluorescence to affect color grading, such as color grading of gemstones. The cut wavelength of the longpass glass plate 3 can be changed by selecting different types of longpass glasses and/or different thickness of longpass glasses. Commonly the cut wavelength of the longpass glass plate 3 is at 400 nm to block UV-A ultraviolet, at 325 nm to block UV-B ultraviolet, or at 280 nm to block UV-C ultraviolet. Practically, the cut wavelength is in the wavelength range from 280 to 420 nm.

The spectral modification glass plate 4 which can range from 0.2 mm to 10.0 mm in thickness modifies the spectral power distribution of lamp, and color temperature conversion glass plates are often used for modifying the spectral power distribution of the lamp to increase or decrease the color temperature of the lamp 6. Usually using one color temperature conversion glass plate to modify the spectral power distribution is not enough to achieve an optimal spectral power distribution and optimal colorimetric indexes for simulating the CIE standard daylight illuminant. Other types of glass plates are required to combine with the color temperature conversion glass plate to achieve the optimal results. The most efficient glass plate combined with a color temperature conversion glass plate for increasing color temperature as well as for obtaining a high color rendering index is the purple glass filter (Corning 7-63). The purple glass filter can partially compensate the extra spectral power around the wavelength of 560 nm caused by the 560 nm peck of color temperature increasing filter, such as Schott FG6 and Hoya LB-40. Practically, a heat absorbing filter 1 can work well with the color temperature increasing glass plate to modify the spectral power distribution of the high color temperature halogen lamps to achieve optimal results.

The longpass colored glass plate 3 and the heat absorbing glass plate 1 consist of a band-pass filter. The longpass glass plate determines the short wavelength boundary, and the heat absorbing glass plate determines the long wavelength boundary of the light passing through the optical filter 5. This band-pass filter only allows light in the wavelength range pass through, totally blocks unwanted ultraviolet, and maximally absorbs heat from the lamp. This band pass filter can be used for museum lighting to protect precious museum objects from ultraviolet damage and heat damage.

When light from a lamp passes through the optical filter 5 with the glass plates 1, 3, and 4 in series, the spectral intensity of the transmitted light is calculated by $$I(\lambda) = I_o(\lambda) \Pi\, P_i(\lambda) \exp[-\alpha_i(\lambda) d_i]$$

Where $I_o(\lambda)$ is the intensity of the incident light from the lamp, $I(\lambda)$ is the intensity of transmitted light, $P_i(\lambda)$ is the reflection factor of the glass plate, $\alpha_i(\lambda)$ is the spectral absorptivity of the glass plate, $d_i$ is the thickness, and i counts the number of the glass plates. The arranged order of glass plates does not affect the intensity of the transmitted light.

Theoretically the more glass plates there are, the better the spectral match is by using the optimal algorithm to design the optical with glass plates in series. Practically, the more glass plates there are, the more difficult it is to design the glass plates, the more difficult it is to fabricate the glass plates, the more the accumulated fabrication error is, and also the more expensive it is. By weighing the advantages and disadvantages, usually an optical filter contains five glass plates or less, usually three or two glass plates for simulating CIE standard daylight illuminant with a halogen lamp.

The design of the serial glass plates is very complex. A new optimization algorithm has been developed to design the optical filter 5 with glass plates 1, 3, and 4 in series for simulating CIE standard daylight illuminant D65 and other phases of daylight, i.e. D50, D55, and D75. The objectives of the optimization algorithm are color rendering index, metamerism index, color temperature, least square of spectral match, and weighted least square of spectral match. The design using the weighted least square as the objective usually also provides optimal color rendering index, metamerism index, and color temperature. However, color rendering index, metamerism index, and color temperature cannot be individually used as the objective to design the glass plates.

Figure 2:
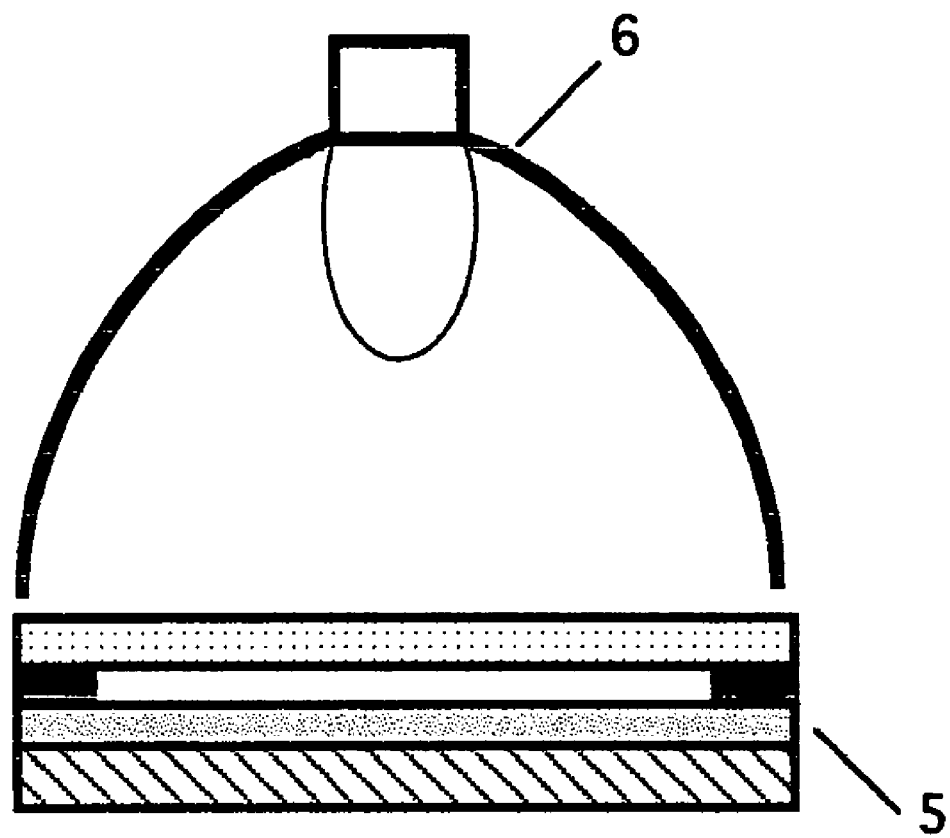
FIG. 2 is an illustration showing an arrangement of the optical filter and the lamp of the CIE daylight simulator according to the present invention: 5. the optical filter; 6. a high color temperature halogen lamp with a reflector.

FIG. 2 shows an arrangement of the optical filter 5 and the high color temperature halogen lamp 6 of the CIE daylight simulator according to the present invention. The lamp 6 integrates a reflector to increase the color temperature up to 6500 K. The light from the lamp 6 passes through the optical filter. The spectral power distribution of the light transmitted from the optical filter matches that of CIE standard daylight illuminant.

Figure 3:
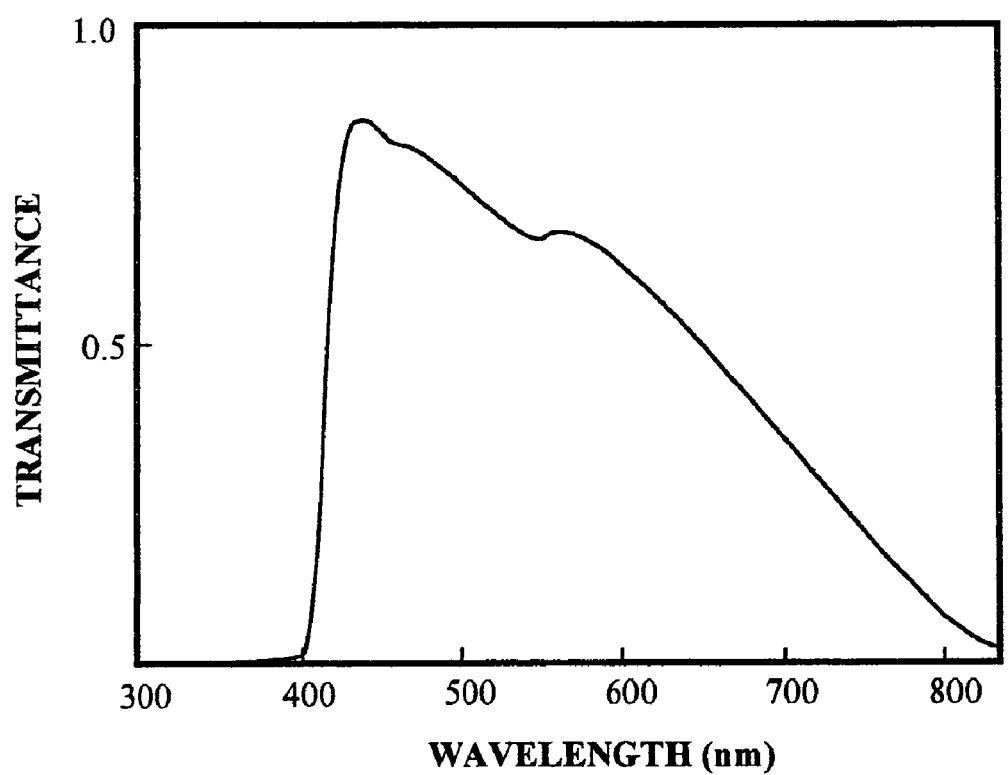
FIG. 3 is a graph showing a typical spectral transmittance of the optical filter with a heat absorbing glass plate, a longpass glass filter, and a color temperature conversion filter as the spectral modification filter for simulating CIE standard daylight illuminant D65.

FIG. 3 shows a typical spectral transmittance of the optical filter 5 with a heat absorbing glass plate 1, a longpass glass plate 3, and a color temperature conversion (increasing) glass plate as the spectral modification filter 4 for simulating CIE standard daylight illuminant D65. The optical filter 5 blocks all ultraviolet radiation with wavelength shorter than 400 nm, therefore UV-A ultraviolet radiation is totally blocked. It is obvious that there is a small peak centered at about 560 nm. The optical filter 5 also absorbs almost all of infrared radiation with wavelength longer than 830 nm, therefore the light passing through this optical filter 5 contains little infrared radiation.

Figure 4:
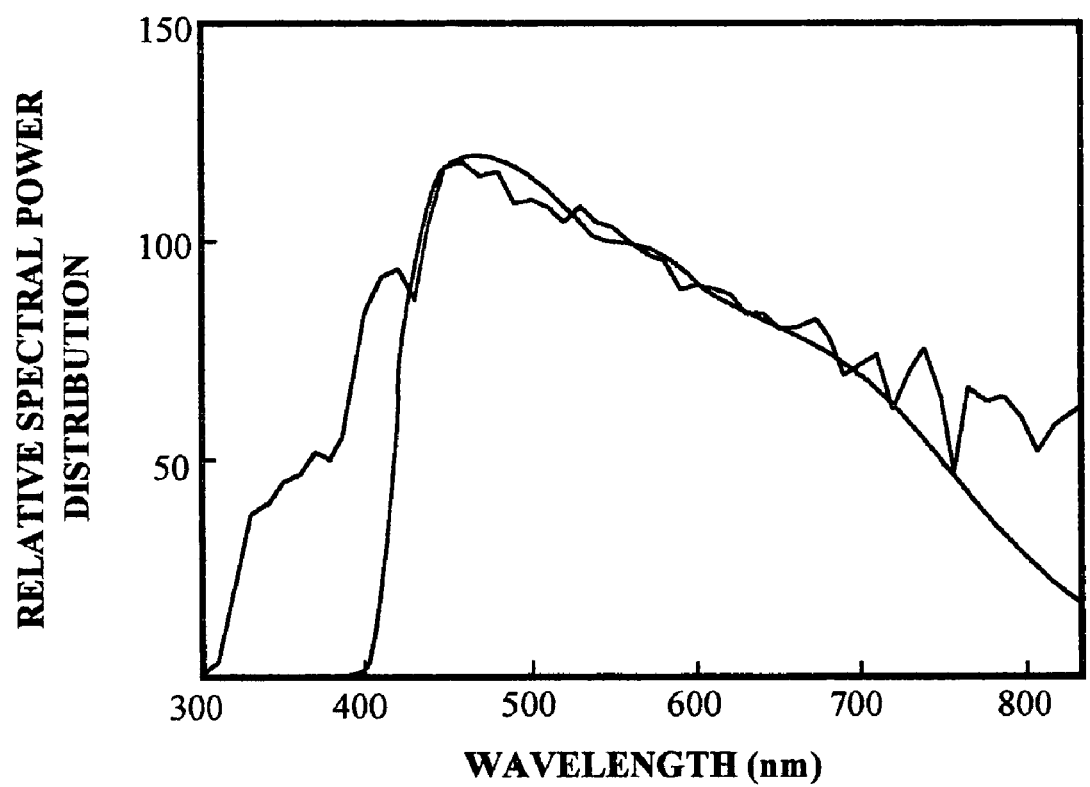
FIG. 4 is a graph showing a spectral power distribution of the CIE D65 simulator produced by the spectral transmittance of the optical filter 5 in FIG. 2 with a 4700 K high color temperature halogen lamp 6. The spectral power distribution has no UV-A ultraviolet radiation and less infrared radiation.

FIG. 4 shows the spectral power distribution of the CIE D65 simulator produced by the spectral transmittance of the optical filter 5 in FIG. 2 with a 4700 K high color temperature halogen lamp 6. The CIE D65 simulator is UV-A ultraviolet radiation free and has much less infrared radiation. By changing the thickness of the three glass plates, mainly changing the thickness of the heat absorbing glass plate and the color temperature increasing glass plate, the spectral power distributions of CIE standard illuminants D50, D55, and D75 can be simulated.

The relative spectral power distribution of the CIE D65 simulator matches that of the CIE standard daylight illuminant D65 in the visible wavelength range. For totally blocking UV-A ultraviolet, the longpass glass plate 3 with an edge wavelength at 420 nm (Hoya GG 420) is used. The lack of violet light in the wavelength range from 400 to 420 nm does not significantly affect the color rendering index, the visible metamerism index, and color temperature due to that the visual perception of human in this wavelength range is very low. The color temperature of the CIE D65 simulator is about 6340 K (absolute temperature), which is slightly lower than that of CIE standard daylight illuminant D65 of 6500 K also due to lacking of violet in the wavelength range from 400 to 420. The color rendering index of this CIE D65 simulator is about 97.3, which is significantly higher than the current commercially available D65 simulators of about 92 or less. It is also higher than that of the D65 simulators using the complex and expensive parallel glass filters introduced by Liu et al. The metamerism index (MIvis) in the visible wavelength range is B (CIELAB). The metamerism index in the ultraviolet wavelength range is not calculated due to the fact that the UV-A ultraviolet is totally blocked by the longpass glass plate 3 of the optical filter.

This CIE D65 simulator does not have any UV-A ultraviolet and has much less heat. It is suitable to be used under the most demanding conditions of avoiding ultraviolet fluorescence for color grading and color matching, for example, for color grading of gemstones since ultraviolet fluorescence affects the color grade. It is well known in the jewelry trade that the blue ultraviolet fluorescence of a colorless to yellow diamond can make it several grades better than that of its true color without the blue ultraviolet fluorescence present. For color grading of gemstones under D65 simulator, the UV-A ultraviolet must be totally removed from the light.

Figure 5:
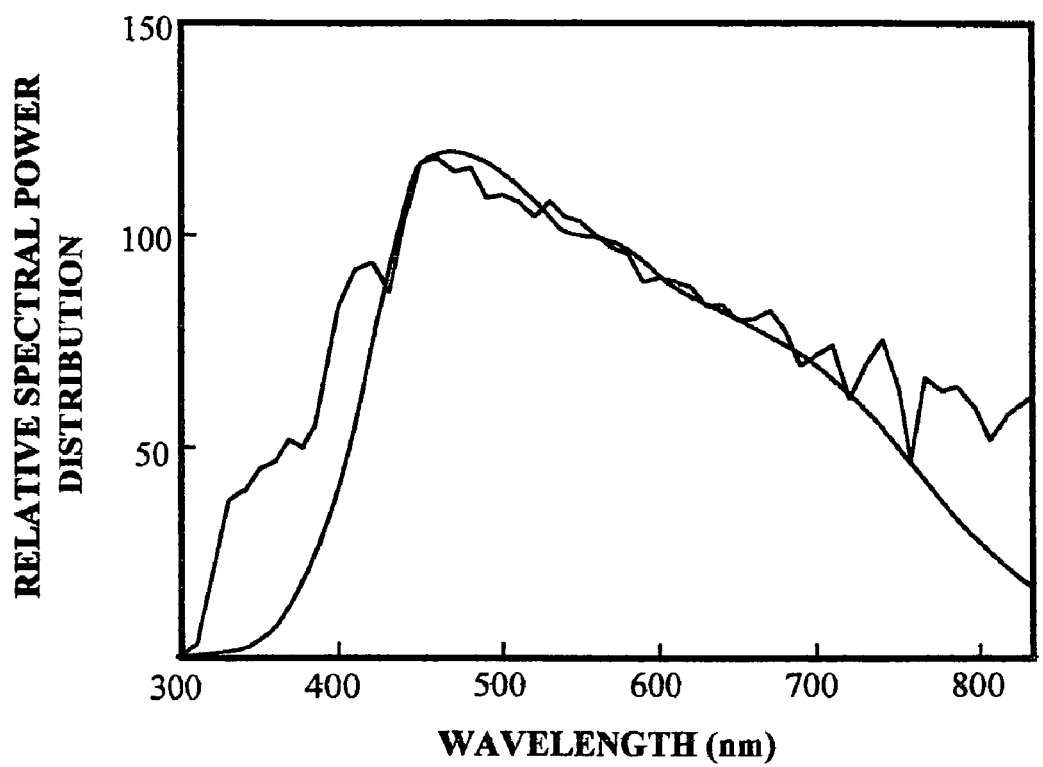
FIG. 5 is a graph showing a spectral power distribution of the CIE D65 simulator produced by the spectral transmittance of the optical filter 5 without the longpass glass plate in FIG. 2 with a 4700 K high color temperature halogen lamp 6 and where the spectral power distribution has ultraviolet radiation.

If the ultraviolet is needed, the longpass glass plate 3 shall be removed from the optical filter 5. Thus, the optical filter 5 includes the heat absorbing glass plate 1 and the color temperature increasing glass plate 4. FIG. 5 shows the spectral power distribution of the CIE D65 simulator with ultraviolet radiation by the optical filter 5 without the longpass glass plate 3. The color temperature of the CIE D65 simulator is about 6478 K, the color rendering index is about 98.0, the metamerism index in the visible wavelength range is A (CIELAB), and the metamerism index in ultraviolet (MIuv) is E. The spectral power distribution match between that of the D65 simulator and that of CIE standard daylight illuminant D65 is further improved. The color rendering index of 98.0 is so far the best by using an optical filter and a halogen lamp to simulate CIE standard daylight illuminant D65. This CIE D65 simulator can be widely used for common color grading and color matching for color research and industrial applications when ultraviolet radiation is required.

It is to be understood that other embodiments and many alterations and modifications may be made without departing from the spirit and scope the present invention.

Defined in detail, the present invention is an optical filter for use with a lamp which emits infrared, visible and ultraviolet radiations, the optical filter comprising: (a) a heat absorbing glass plate also called an infrared absorbing glass plate for absorbing the heat from the lamp; (b) a heat insulation washer for insulating the direct heat transfer from the heat absorbing glass plate to other glass plates; (c) a longpass glass plate for blocking unwanted short wavelength radiation, mainly ultraviolet radiation, from lamp; and (d) one or more spectral modification colored glass plates for modifying the spectral power distribution of the lamp.

Defined alternatively, the present invention is a CIE daylight simulator comprising: (a) an optical filter; and (b) a high color temperature halogen lamp.

Defined more broadly, the present invention is an optical filter for use with a lamp which emits infrared, visible, and ultraviolet radiations, the optical filter comprising: (a) a heat adsorbing glass plate for absorbing heat from the lamp; (b) a longpass glass plate for blocking unwanted short wavelength radiation such as ultraviolet radiation from the lamp; (c) at least one spectral modification colored glass plate for modifying the spectral power distribution of the lamp; and (d) means to create an air gap between the heat absorbing glass plate and the other glass plates.

Defined even more broadly, the present invention is an optical filter for use with a lamp which emits infrared, visible and ultraviolet radiations, the optical filter comprising: (a) a heat absorbing glass plate also called an infrared absorbing glass plate for absorbing the heat from the lamp; (b) at least one spectral modification colored glass plate for modifying the spectral power distribution of the lamp; and (c) means to create an air space between the heat absorbing glass plate and the spectral modification glass plate.

Defined most broadly, the present invention is an optical filter for use with a lamp, the optical filter comprising at least one spectral modification colored glass plate for modifying the spectral power distribution of the lamp.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An optical filter for use with a lamp which emits infrared, visible and ultraviolet radiations, the optical filter comprising:
   a. a heat absorbing glass plate also called an infrared absorbing glass plate for absorbing the heat from the lamp;
   b. a heat insulation washer for insulating the direct heat transfer from the heat absorbing glass plate to other glass plates;
   c. a longpass glass plate for blocking unwanted short wavelength radiation, mainly ultraviolet radiation, from lamp; and
   d. one or more spectral modification colored glass plates for modifying the spectral power distribution of the lamp.

2. The optical filter claimed in claim 1 wherein said heat absorbing glass plate is tempered or heat strengthen treated.

3. The optical filter claimed in claim 1 wherein said heat insulation washer has the same shape as the outline of the said glass plates with an aperture in middle for allowing light to pass through.

4. The optical filter claimed in claim 1 wherein the cut wavelength of said longpass glass plate is from 280 nm for UV-C, to 325 nm for UV-B, to 400 nm for UV-A, and to 450 nm for short wavelength visible light.

5. The optical filter claimed in claim 1 wherein said spectral modification glass plate is a color temperature conversion glass plate.

6. The optical filter claimed in claim 1 wherein said spectral modification glass plate further includes one or more from the group comprising blue, blue-green, green, yellow, orange, red, multiband, and neutral density colored glass plates.

7. The optical filter claimed in claim 1 wherein said heat absorbing glass plate is the first glass plate to receive light from lamp.

8. The optical filter claimed in claim 1 wherein said heat insulation washer is mounted between said heat absorbing glass plate and said other glass plates.

9. An optical filter for use with a lamp which emits infrared, visible and ultraviolet radiations, the optical filter comprising:
   a. a heat adsorbing glass plate for absorbing heat from the lamp;
   b. a longpass glass plate for blocking unwanted short wavelength radiation such as ultraviolet radiation from the lamp;
   c. at least one spectral modification colored glass plate for modifying the spectral power distribution of the lamp; and
   d. means to create an air gap between the heat absorbing glass plate and the other glass plates.

10. The optical filter claimed in claim 9, wherein said means to create an air gap is a washer with an aperture therethrough to permit light to pass through the aperture.

11. The optical filter claimed in claim 9, wherein said washer has the same shape as the outline of said glass plates.

12. The optical filter claimed in claim 9 wherein the cut wavelength of said longpass glass plate is from 280 nm for UV-C, to 325 nm for UV-B, to 400 nm for UV-A, and to 450 nm for short wavelength visible light.

13. The optical filter claimed in claim 9 wherein said spectral modification glass plate is a color temperature conversion glass plate.

14. The optical filter claimed in claim 9 wherein said spectral modification glass plate further includes one or more from the group comprising blue, blue-green, green, yellow, orange, red, multiband, and neutral density colored glass plates.

15. The optical filter claimed in claim 9 wherein said heat absorbing glass plate is the first glass plate to receive light from lamp.

16. The optical filter claimed in claim 9 wherein said longpass glass plate and said spectral modification glass plates can be arranged in any order without changing the modified spectral power distribution of said lamp.

* * * * *